T. J. KALLAUNER.
LAWN MOWER ATTACHMENT FOR USE ON TERRACES.
APPLICATION FILED JUNE 29, 1920.
1,368,503. Patented Feb. 15, 1921.
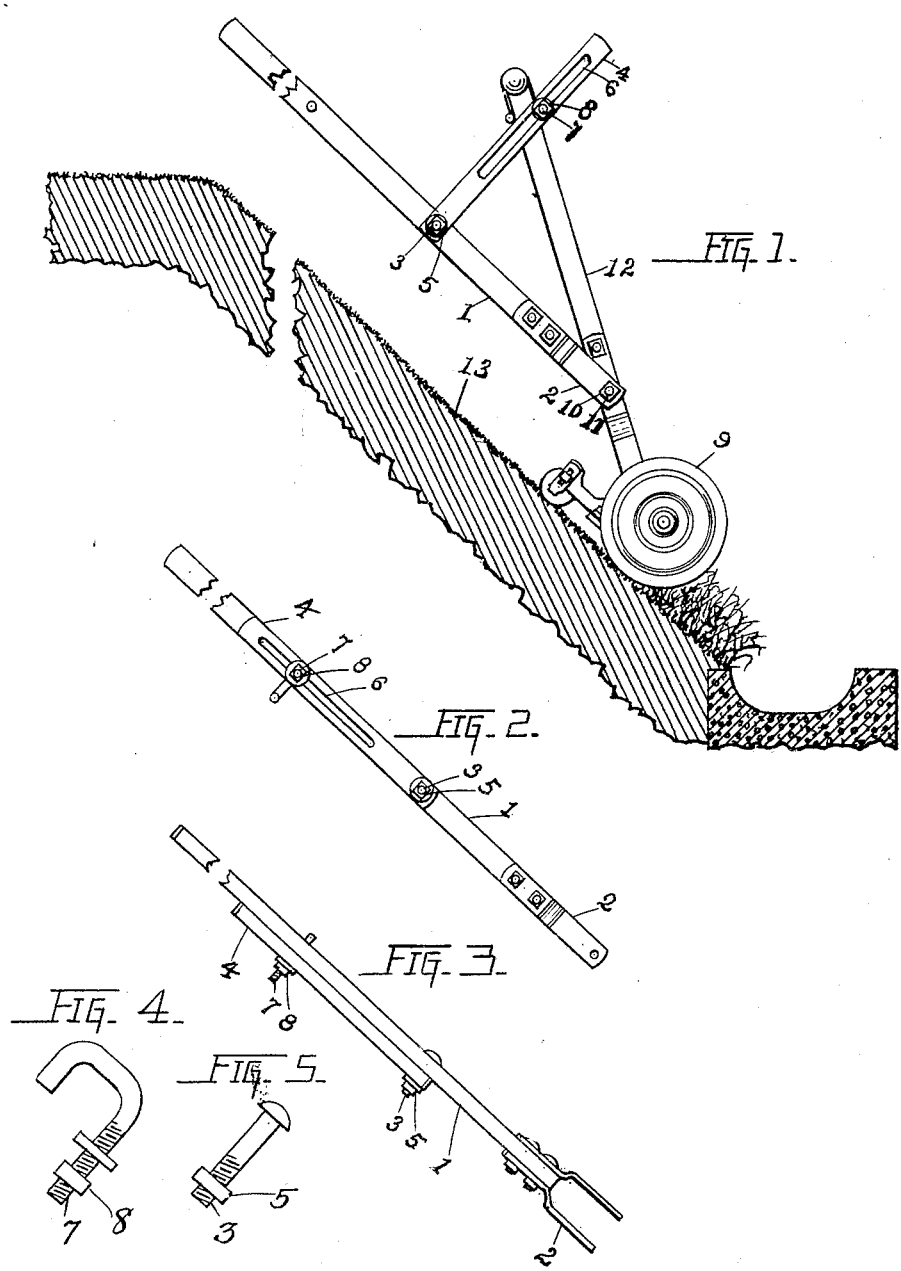

UNITED STATES PATENT OFFICE.

THEODORE J. KALLAUNER, OF ST. JOSEPH, MISSOURI.

LAWN-MOWER ATTACHMENT FOR USE ON TERRACES.

1,368,503.      Specification of Letters Patent.    Patented Feb. 15, 1921.

Application filed June 29, 1920. Serial No. 392,656.

*To all whom it may concern:*

Be it known that I, THEODORE J. KALLAUNER, a citizen of the United States, residing at St. Joseph, in the county of Buchanan and State of Missouri, have invented certain new and useful Improvements in Lawn-Mower Attachments for Use on Terraces, of which the following is a specification, reference being had therein to the accompanying drawing.

My invention relates to improvements in that class of lawn mower attachments, which are used for controlling the movements of lawn movers while they are in use on terraces, and the objects of my improvements are, first: to provide an attachment of this class, which can readily and quickly be rigidly attached to or detached from lawn mower handles of various forms in transverse section, such as rectangular, round and the like, second: to provide adjusting means whereby the attachment can be secured on the handle of a lawn mower at various angles of inclination thereto, for adapting the thus equipped lawn mower to be used on terraces of various degrees of inclination to the horizontal and of various heights, third: to so construct and arrange the parts of the attachment that it can be folded in compact form for storage or shipment, and be secured in its folded position by the use of one of its parts, thus avoiding loss or misplacement of said part, while the attachment is not in use, fourth: to so construct the attachment, that it shall be neat in appearance, substantial, can easily be made of various lengths and be cheap in cost of manufacture.

I attain these objects by the devices illustrated in the accompanying drawings, in which:

Figure 1 is side view of the attachment as it appears when in use, attached to a lawn mower, a portion of the bar being broken away. Fig. 2 is a side view of the attachment folded, a portion of the bar being broken away. Fig. 3 is a top view of the parts seen in Fig. 2. Fig. 4 is an enlarged view, in detail of the brace-securing hook. Fig. 5 is a similar view of the front one of the handle-securing bolts of a lawn mower.

The attachment comprises the following described parts.

The preferably wooden bar 1, on each side of the front end of which a metal bar extension 2 is secured. An aperture is formed through the front end of each one of said bar extensions, as seen in Fig. 2. An aperture is formed through the intermediate portion of said bar, through which the bolt 3 is passed, on which bolt the lower end of the brace 4 is adjustably secured by the nut 5.

The slot 6 is formed longitudinally through the brace 4, through which slot the screw threaded end of the hook 7 is passed, after being passed through an aperture formed through the rear end portion of the bar 1, as seen in Figs. 2 and 3, with the nut 8 screwed onto said threaded end of said hook, for holding said brace against one side of said bar; thereby keeping the attachment in compact form, for storage or shipment, and at the same time preventing loss or misplacement of the hook 7.

The attachment seen in Figs. 2 and 3 is attached to the lawn mower 9, seen in Fig. 1, and is used in the following manner:

The operator of the lawn mower removes nut 10 from the bolt 11, and thereafter removes said bolt from an aperture formed through the handle 12 of the lawn mower. He then removes the hook 7 from the position seen in Fig. 2, and loosely connects the parts of the attachment to the handle of said lawn mower as seen in Fig. 1. He thereafter adjusts the bar 1 to such inclination to the handle 12, as adapts it to be used for controlling the movements of the lawn mower 9 on the terrace 13. Said operator then tightens the nuts 8, 5 and 10, thereby rigidly securing the parts of the attachment on the handle 12, in their adjusted position. He then grasps the rear end portion of the bar 1, and thereby operates said lawn mower, in the usual manner.

Where another terrace of different inclination from the terrace 13 is to be mowed, the operator of the mower loosens the nuts 8, 5 and 10, readjusts said inclination of the bar 1, to coincide with the inclination of said other terrace, retightens said nuts and grasps the rear end portion of the bar 1, and repeats the previously described grass cutting operations.

When the attachment is not in use, the parts are moved from the position seen in Fig. 1, to the position seen in Fig. 3, and the bolt 11 is resecured in the lawn mower handle 12.

Having fully described my invention, what I claim as new and desire to secure by Letters Patent, is:

A bar provided with an aperture formed through the rear end portion thereof; a bar extension secured on each side of the front end of said bar each one of which bar extensions being provided with an aperture formed through its front end for its attachment to the handle of a lawn mower said handle being provided with an aperture therethrough; a bolt passed through the apertures of said handle and bar extensions with the latter astride said handle; a nut on said bolt whereby said handle and bar extensions are tightly secured together; a brace provided with a slot formed longitudinally therethrough; securing means whereby the lower end of said brace is detachably secured on the central portion of said bar; a hook provided with a screw threaded shank portion said hook being engaged with the rear end portion of said mower handle with its shank passed through the slot of said brace; and a nut screwed on said threaded shank for tightly holding said brace against said mower handle.

In testimony whereof I affix my signature.

THEODORE J. KALLAUNER.